United States Patent [19]
Okada et al.

[11] Patent Number: 5,897,226
[45] Date of Patent: *Apr. 27, 1999

[54] IMAGE BLUR PREVENTION APPARATUS WITH LOCKING DEVICE

[75] Inventors: Tadanori Okada, Yokohama; Yoshihiko Konno, Tokyo, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/526,666

[22] Filed: Sep. 11, 1995

[30] Foreign Application Priority Data

Sep. 19, 1994 [JP] Japan .................................. 6-248355

[51] Int. Cl.$^6$ ................................................. G03B 17/00
[52] U.S. Cl. .............................................. 396/55; 359/554
[58] Field of Search ..................................... 354/202, 430, 354/70; 359/554, 557; 348/208; 396/52, 53, 55

[56] References Cited

U.S. PATENT DOCUMENTS 5,181,056  1/1993  Noguchi et al. .................... 354/202 X

FOREIGN PATENT DOCUMENTS 2-111174  4/1990  Japan .

*Primary Examiner*—Howard B. Blankenship
*Attorney, Agent, or Firm*—Fitzpatrick, Cella, Harper & Scinto

[57] ABSTRACT

An image blur prevention apparatus for use with an image blur prevention device which prevents image blur and a restricting device which restricts movement of the image blur prevention device. The apparatus includes a releasing device which releases the image blur prevention device from a restricted state in which movement of the image blur prevention device is prevented by the restricting device and a holding device which holds a released state in which the image blur prevention device is released from the restricted state. The holding device holds the released state in a holding operation when electric current is supplied thereto. Operation of the holding device switches from the holding operation to a state in which the holding operation is not effected, when the supply of electric current is substantially discontinued.

19 Claims, 15 Drawing Sheets

《UNLOCKED STATE》

《UNLOCKED STATE》

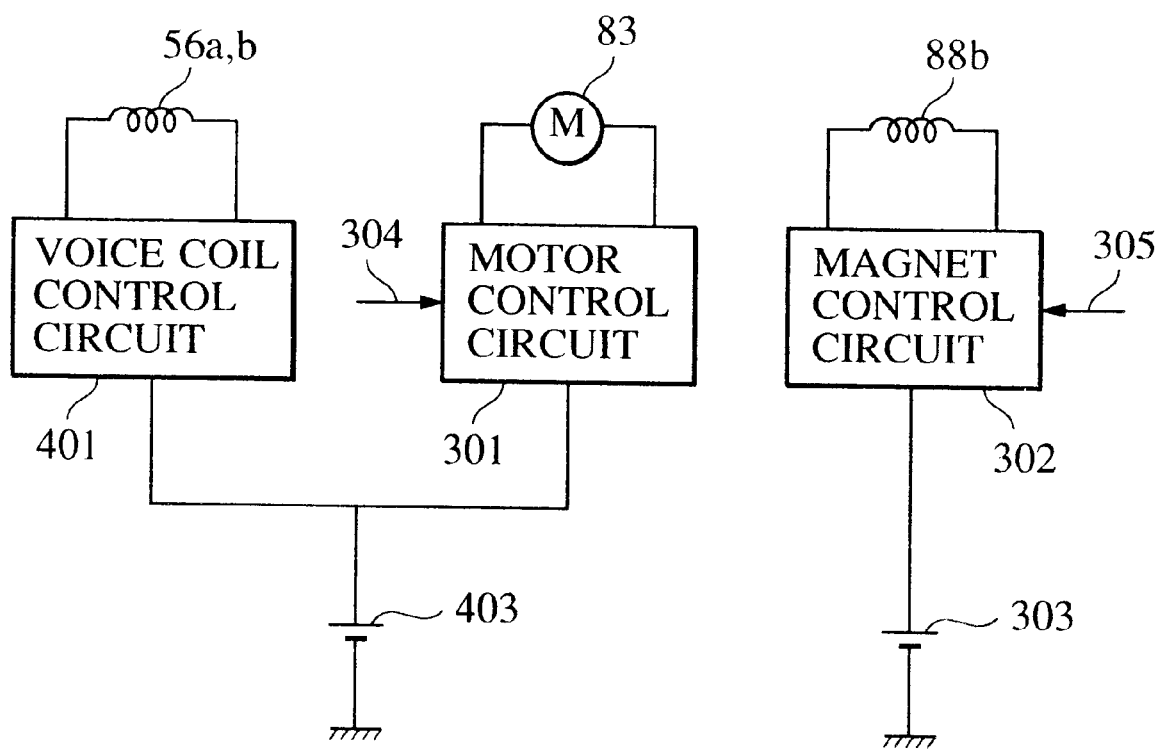

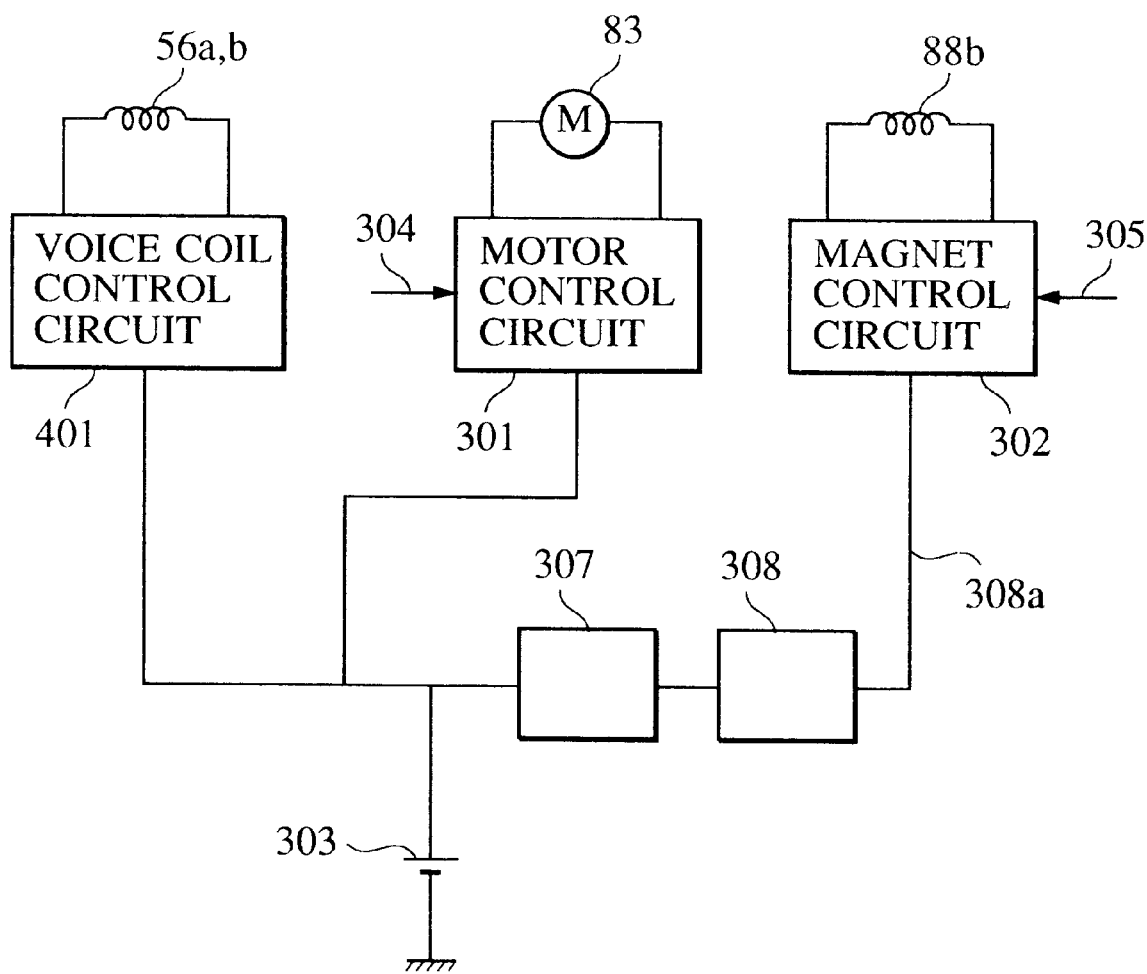

IMAGE BLUR PREVENTION APPARATUS WITH LOCKING DEVICE

BACKGROUND OF THE INVENTION

1. Field of the Invention

The present invention relates to an image blur prevention apparatus for preventing image blur which may occur due to camera shake or the like in a camera, an optical apparatus or the like.

2. Description of the Related Art

The prior art targeted by the present invention will be described below by using a camera as an example.

Cameras at the present time have become increasingly automated, and the possibility that persons unskilled in the handling of cameras will fail in photo-taking is very small. However, it has been difficult to automatically prevent a failure in photo-taking due to camera shake.

Therefore, in recent years, research and development of cameras for the purpose of preventing a failure in photo-taking due to camera shake of a photographer has been vigorously under way.

As a method of suppressing camera shake caused by a photographer, there is a method in which vibrations due to camera shake are detected, and a correction lens is displaced in correspondence with the detected value in order to correct the optical displacement of the image. To describe in more detail, shake vibrations are detected by vibration sensors, such as accelerometers or angular speedometers, angular velocity is detected electrically or mechanically on the basis of sensor signals, the correction optical system (which is a part of or the whole of the photographic optical system) is parallelly off-set in a direction at right angles to the optical axis on the basis of the detected information, or a correction lens is displaced in a direction different from the optical axis, for example, the optical axis is inclined.

As a method of driving a correction optical system, when the correction optical system is parallelly off-set in a direction at right angles to the optical axis, a connection member is secured to a fixation section of a photographic apparatus in such a manner as to be movable in a direction (e.g., up and down) at right angles to the optical axis, and a correction lens frame is secured to the connection member, to which correction lens frame a correction lens is secured so as to be movable in a different direction (e.g., from side to side) at right angles to the optical axis. Thus, the correction optical system can be moved in any direction at right angles to the optical axis with respect to the fixation section.

As an actuator for driving a correction lens, two electromagnetic coils corresponding to the above-described two directions at right angles to the optical axis are mounted in the correction lens frame, and a yoke and a permanent magnet in a pair are mounted in correspondence with the two coils in the fixation section. In this way, a moving coil type actuator is formed which is capable of controlling two direction components independently of each other.

Further, the position of the correction lens is detected, and the positional information is fed back, thereby realizing drive control of the correction lens with a high degree of accuracy.

In the above, shake correction employing a correction optical system has been described. After photographing is terminated, it is necessary to hold the correction optical system at a predetermined position. In a case where, in particular, the correction optical system moves in any direction because of the weight of the system itself as a result of the shut-off of the power supply, as in a moving coil type, a lock mechanism is especially required. When the fact that photographing is performed without correction of shake is taken into consideration, it is preferable that the correction optical system is held at the position where the optical axis of the correction optical system is made to coincide with the optical axis of the whole photographic optical system in terms of the position with the greatest optical performance.

Conventional examples of a lock mechanism formed to achieve such an object:

(1) A lock member is provided for holding the correction optical system at a neutral position, and the lock member is urged in a direction on which it is locked by a spring. When shake is to be corrected, the lock member is retracted from the lock position in opposition to the urging force of the spring by means of a solenoid so that the state in which the correction lens can be moved is maintained. When the correction of shake is terminated, by shutting off the supply of electric current to the solenoid, the lock member is driven to the lock position by the urging force of the spring, and the correction optical system is held at the neutral position again.

(2) By making the lock member for holding the correction optical system at the neutral position retract from the lock position by a motor, a shake correctable state is formed. By making the motor rotate reversely (or, further rotating), the lock member is driven to the lock position.

(3) A similar lock member is previously urged by a spring in a direction in which it is locked. When the shake is to be corrected, while the lock member is kept retracted from the lock position by a motor, the lock member is locked by a hook, and the state in which the correction optical system can be moved is maintained. When the correction of shake is terminated, the motor is slightly moved reversely, and the locking of the hook is released. In this way, the lock member is driven to the lock position by the spring. In this case, even if the power supply is discontinued suddenly while the correction of shake is being performed, the lock member can be locked by merely making the motor slightly rotate reversely by a back-up power supply.

(4) A bistable plunger is provided. When no correction of shake is to be performed, the correction lens is driven to the neutral position by a conventional actuator for correcting shake. In that state, a projection provided in the fixation section is inserted by the plunger into a hole provided in the correction lens frame, and the correction lens is locked.

However, the conventional examples have the following problems.

In the conventional example (1) described above, the solenoid requires a huge amount of electric power in order to drive the lock member by the solenoid to the state in which shake can be corrected. If less electric power is to be used, the shake correction range (correction angle) must be made narrower.

In the conventional examples (2) and (4) described above, if the power supply is discontinued suddenly while the correction of shake is being performed, the correction optical system cannot be locked. Not only can the subsequent photographing not be performed, but also the correction optical system which is not locked becomes unsteady because of the movement of the apparatus. There is even the risk that the apparatus might be damaged.

In the conventional example (3) described above, it is possible to lock the correction optical system even when the power supply is suddenly turned off. However, a capacitor serving as a back-up power supply is physically too large to be disposed in, in particular, a camera or a lens barrel, impeding the compactness of the apparatus.

SUMMARY OF THE INVENTION

According to one aspect of the present invention, there is provided an image blur prevention apparatus comprising: first means for releasing image blur prevention means for preventing image blur from a predetermined state; and second means for holding the state in which the image blur prevention means is released from the predetermined state by the first means, the second means performing the holding operation when electric current is supplied thereto, and not performing the holding operation when the supply of electric current is discontinued. Thus, the releasing operation and the holding operation are performed properly and efficiently.

According to another aspect of the present invention, there is provided an image blur prevention apparatus comprising: actuating means for releasing image blur prevention means for preventing image blur from a predetermined state in a first manner, and for holding the state in which the image blur prevention means is released from the predetermined state in a second manner different from the first manner, the actuating means performing the holding operation when electric current is supplied thereto, and not performing the holding operation when the supply of electric current is discontinued. Thus, the releasing operation and the holding operation are performed properly and efficiently.

The above and further objects, aspects and novel features of the invention will more fully appear from the following detailed description when read in connection with the accompanying drawings.

BRIEF DESCRIPTION OF THE DRAWINGS

FIG. 15 is an exploded perspective view of the lock unit for fixing the second group lens L2 at the neutral position; and FIG. 16 is an exploded perspective view of the lock unit for fixing the second group lens L2 at the neutral position.

DETAILED DESCRIPTION OF THE PREFERRED EMBODIMENTS

Preferred embodiments of the present invention will be explained below with reference to the accompanying drawings.

First Embodiment

Figure 1:
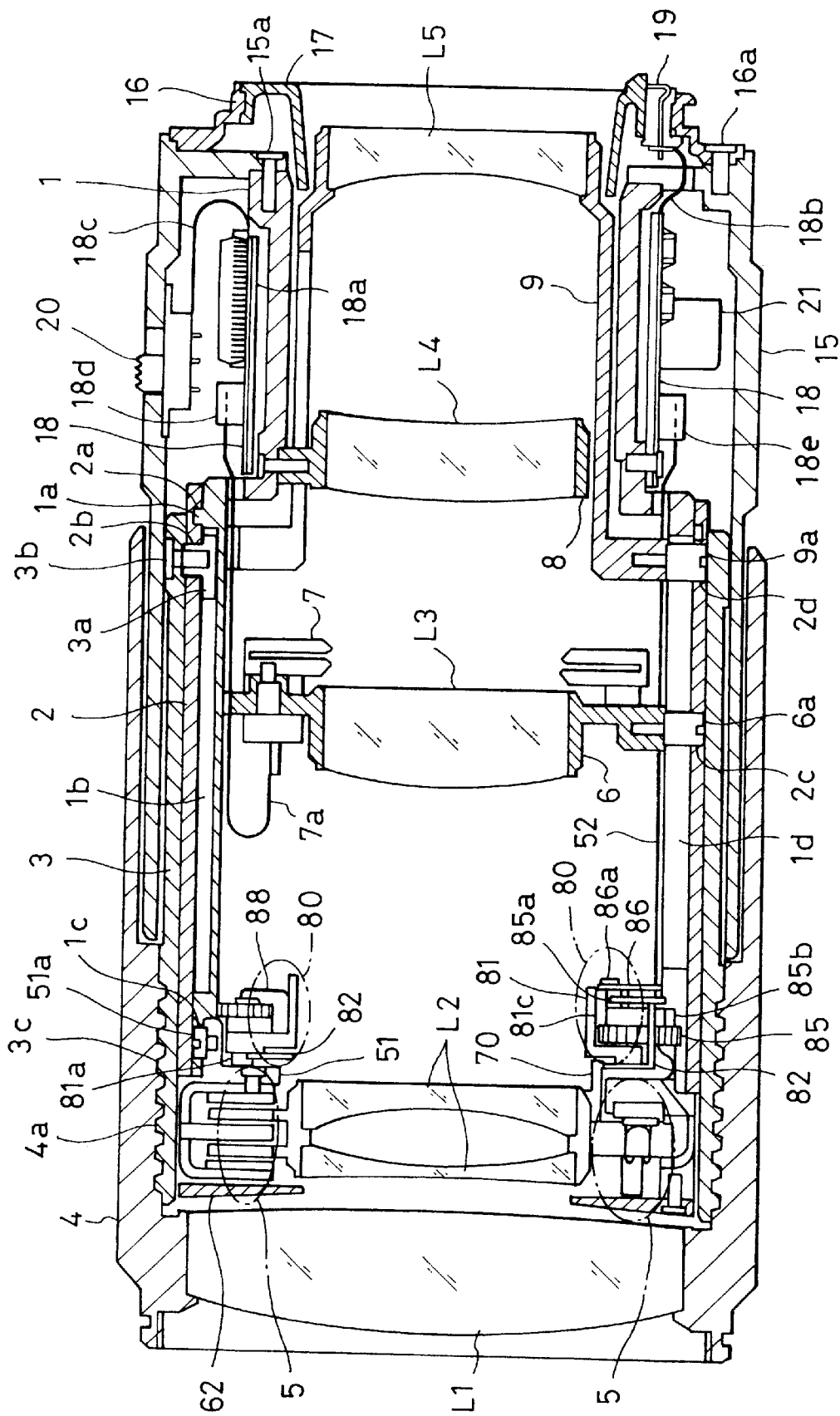
FIG. 1 is a sectional view illustrating a zoom lens barrel in accordance with a first embodiment of the present invention.
Figure 2:
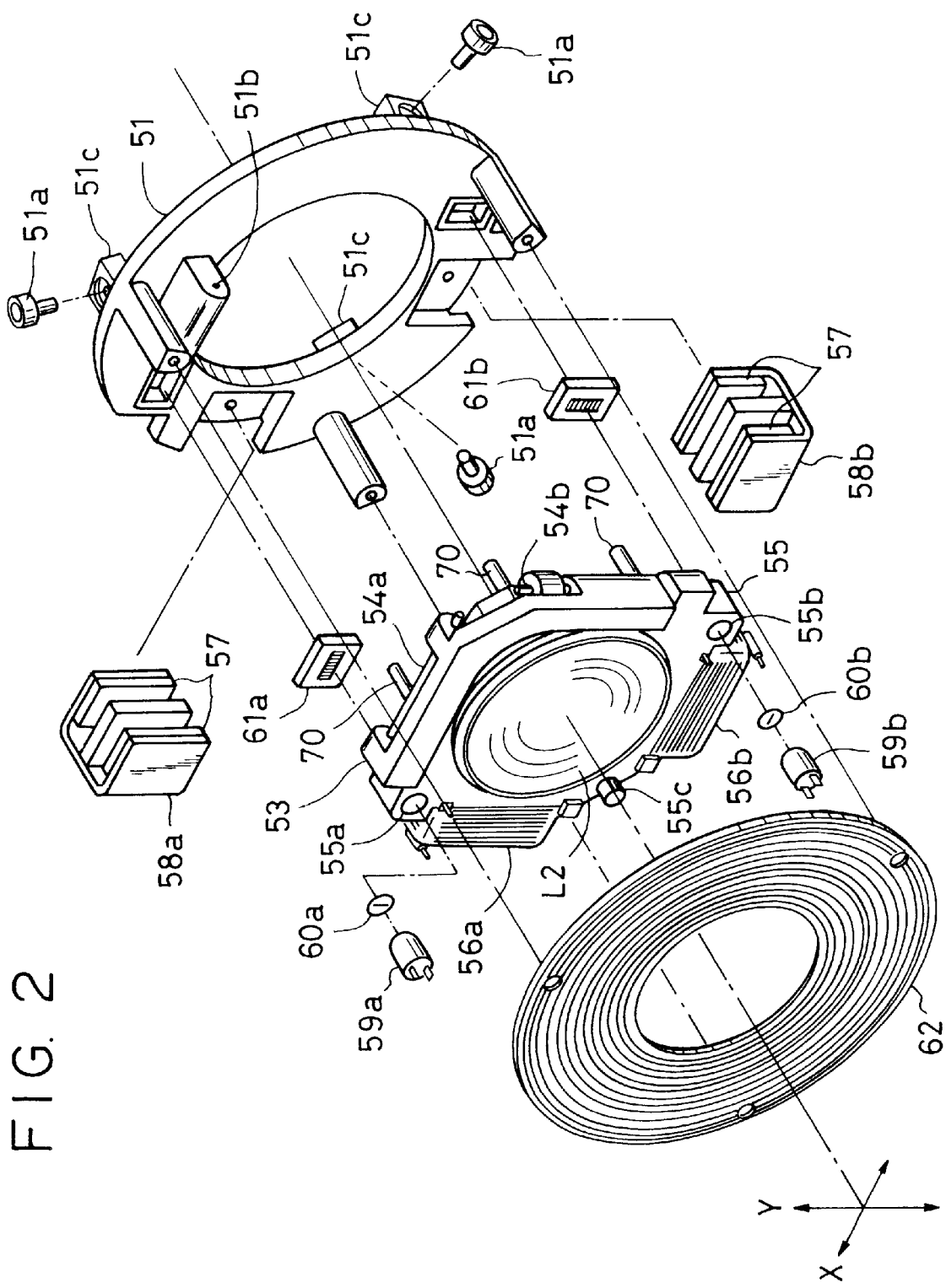
FIG. 2 is an exploded perspective view illustrating a shake correction unit incorporated into the lens barrel of FIG. 1.

FIG. 1 is a sectional view illustrating a zoom lens barrel in accordance with a first embodiment of the present invention. FIG. 2 is an exploded perspective view illustrating a shake correction unit incorporated into the lens barrel of FIG. 1.

Referring to FIG. 1, reference numeral 1 denotes a fixed barrel having a large-diameter portion in the front thereof and a small-diameter portion in the rear thereof; reference numeral 2 denotes a cam cylinder which is positioned outside the fixed barrel 1 and held rotatable about the optical axis of the lens, which cam cylinder is held rotatably at the fixed position as a result of the bayonet coupling so that a peripheral groove 2a formed in the inner peripheral surface in the rear is engaged with a projection 1a provided in the fixed barrel 1.

Reference numeral 3 denotes a rectilinear cylinder 3 in which a key 3a is fixed at evenly spaced three places by step screws 3b in the inner peripheral portion at the rear end. Since the key 3a is engaged with a rectilinear groove 1b provided in the fixed barrel 1 and a first group cam groove 2b formed in the cam cylinder 2 at the same time, when the rectilinear cylinder 3 moves in the direction of the optical axis, the cam cylinder 2 rotates.

FIG. 1 shows a wide state, and the rectilinear cylinder 3 is more extended toward the forward as a telephoto-state is formed.

A male helicoid 3c is formed in the outer periphery of the forward portion of the rectilinear cylinder 3 and is engaged with a female helicoid 4a formed in the inner periphery of a first group lens barrel 4 to which the first group lens L1 is secured. That is, by rotating the first group lens barrel 4, the first group lens L1, together with the first group lens barrel 4, is moved in the direction of the optical axis by the helicoid mechanism.

In this embodiment, by making the first group lens barrel 4 move in the direction of the optical axis, the first group lens L1 is greatly moved integrally with the rectilinear cylinder 3, and thus zooming is performed. By making the first group lens barrel 4 rotate, the first group lens L1 is slightly moved in the direction of the optical axis, and thus focusing is performed.

This construction is concerned with one ring type rectilinear zoom of what is commonly called manual focus. The rectilinear movement of the first group lens barrel 4 in the direction of the optical axis causes the cam cylinder 2 to be rotated, and thus a zooming operation is realized.

Reference numeral 5 denotes a shake correction unit to be described later, which is fixed as a result of the engagement of a roller 51a mounted in a foot section 51c which projects toward the rear from the main body 51 of the shake correction unit 5, with a mounting hole 1c provided in the fixed barrel 1. Reference character L2 denotes a second group lens, which is not moved in the direction of the optical axis during zooming, and is held so as to be movable only in a direction at right angles to the optical axis with respect to the shake correction unit 5 in order to correct shake.

Reference numeral 6 denotes a third lens barrel to which a third group lens L3 is secured and to which a conventional electromagnetic diaphragm unit 7 is fixedly secured by a screw. The third lens barrel 6 has three rollers 6a along the circumference thereof. This roller 6a is engaged with a rectilinear groove 1d provided in the fixed barrel 1 and a third group cam groove 2c provided in the cam cylinder 2 at the same time.

Reference numeral 8 denotes a fourth group lens barrel to which a fourth group lens L4 which is not moved during zooming is secured, and the fourth group lens barrel is fixed to the small-diameter portion of the fixed cylinder by screws. Reference numeral 9 denotes a fifth group lens barrel which holds a fifth group lens L5 and has three rollers 9a in the outer periphery of the flange section in the front. The rollers 9a are engaged with the rectilinear groove 1d in common use with the third group lens L3, which rectilinear groove 1d is provided in the fixed barrel 1, and engaged with a fifth group cam groove 2d formed in the cam cylinder 2 at the same time. Therefore, when the cam cylinder 2 is rotated, the first group lens L1, the third group lens L3, and the fifth group lens L5 are simultaneously moved in the direction of the optical axis, and thus a zooming operation is performed.

Reference numeral 15 denotes an exterior ring which is secured to the fixed barrel 1 at the back end by means of a screw 15a. Further, a mount 16 to be mounted in the camera unit (not shown) is secured to the exterior ring 15 by means of a screw 16a.

Reference numeral 17 denotes a rear lid which is fixed with elasticity to the mount 16, which rear lid acts to prevent the interior of the lens barrel from being seen and to shut off stray light.

Reference numeral 18 denotes a mounting part composed of a flexible printed board for controlling the driving of the diaphragm unit 7 and the shake correction unit 5, which printed board is pasted to a board holding base 18a in a polygonal shape by means of a double-coated tape and is fixed to the outer periphery of the small-diameter portion of the fixed barrel 1 by means of a screw. A connection section 18b is extended behind the mounting part 18 and is electrically connected to a contact part 19 for allowing communication with the camera unit. Electric power for the circuit for controlling the driving of the diaphragm unit 7 and the shake correction unit 5 is supplied through the contact part 19 and a contact section 18b.

Reference numeral 7a denotes a flexible printed board for electrically connecting the diaphragm unit 7 to the mounting part 18. Since the front portion of the printed board is disposed bent in the shape of a U, a stable electrical connection is made even if the diaphragm unit 7 is moved in the direction of the optical axis because of zooming, and the back end of the printed board is connected to a connector 18d inside the mounting part 18.

Reference numeral 52 denotes a flexible printed board for electrically connecting the shake correction unit 5 to the mounting part, the front end of which printed board is connected to the drive means of the second group lens L2 for performing shake correction and to the position detecting means for detecting the position of the second group lens L2, and the back end thereof is connected to a connector 18e inside the mounting part 18.

Reference numeral 20 denotes a switch for switching between whether shake correction should be performed or not. The switch 20 is mounted in the exterior ring 15 so that the switch 20 can be operated from outside and allows communication with the control circuit through a connection section 18c extended from the mounting part 18.

Reference numeral 21 denotes a shake sensor for detecting camera shake. In this embodiment, an angular velocity is detected by using a shake gyroscope. The shake sensor 21 is secured to each of the top surface and the side surface of the mounting part 18 so that, when a lens barrel is mounted in the camera unit, rotational shake along the longitudinal direction (pitch direction) of the camera and rotational shake along the lateral direction (yaw direction) can be detected.

Each shake sensor is electrically connected to a vibration isolation control circuit of the mounting part 18. The output from the sensor is converted into an angular displacement by the vibration isolation control circuit. Further, focusing distance information, subject distance information or the like is added thereto and converted into the amount of off-center of the correction lens and supplied to control the driving.

Next, the construction of the shake correction unit 5 will be described with reference to FIG. 2.

Referring to FIG. 2, reference numeral 51 denotes a main body of the shake correction unit 5, rollers 51a being fixed in the outer peripheral portion of the main body 51 at evenly spaced three places. This roller 51a is engaged with the mounting hole 1c (see FIG. 1) of the fixed barrel 1, and the entire shake correction unit 5 is securely held.

Reference numeral 53 denotes a connecting arm which is supported movably from side to side (hereinafter referred to as the "X direction") with respect to a pin 54a. A pin 54b is fixed vertically (hereinafter referred to as the "Y direction") to the connecting arm 53. An eccentric frame 55 is supported in the pin 54b so as to be movable in the Y direction. Therefore, when the pin 54a is fixed to a hole 51b of the main body 51, the eccentric frame 55 is held so as to be movable in both the X and Y directions with respect to the main body 51.

Further, a projection 55c is provided in each of the front side and the back side of the eccentric frame 55. The eccentric frame 55 is not moved in the direction of the optical axis when the projection 55c is brought into contact with the front side of the main body 51 and the rear side of a light shielding plate 63 to be described later.

Voice coils 56a and 56b are bonded to the eccentric frame 55 for the purpose of driving the eccentric frame 55 in the X and Y directions, respectively. Yokes 58a and 58b to which magnets 57 are bonded are fixed by screws to the main body 51 at positions corresponding to the voice coils 56a and 56b.

As eccentric position detecting means for detecting the eccentric position of the eccentric frame 55, a pair of IREDs 59a and 59b serving as light projecting devices, together with slits 60a and 60b, are inserted into holes 55a and 55b of the eccentric frame 55 and fixed, and a pair of PSDs 61a and 61b serving as photoreceptor devices are fixed to the main body 51.

Reference numeral 62 denotes a light shielding plate, which is fixed by screws to the front end of the main body 51, light shielding rays being formed on the front. This light shielding plate 62 prevents stray light to the PSDs 61a and 61b when the eccentric amount of the correction lens is detected during shake correction and works to limit a light beam which enters from the front of the lens.

Figure 3:
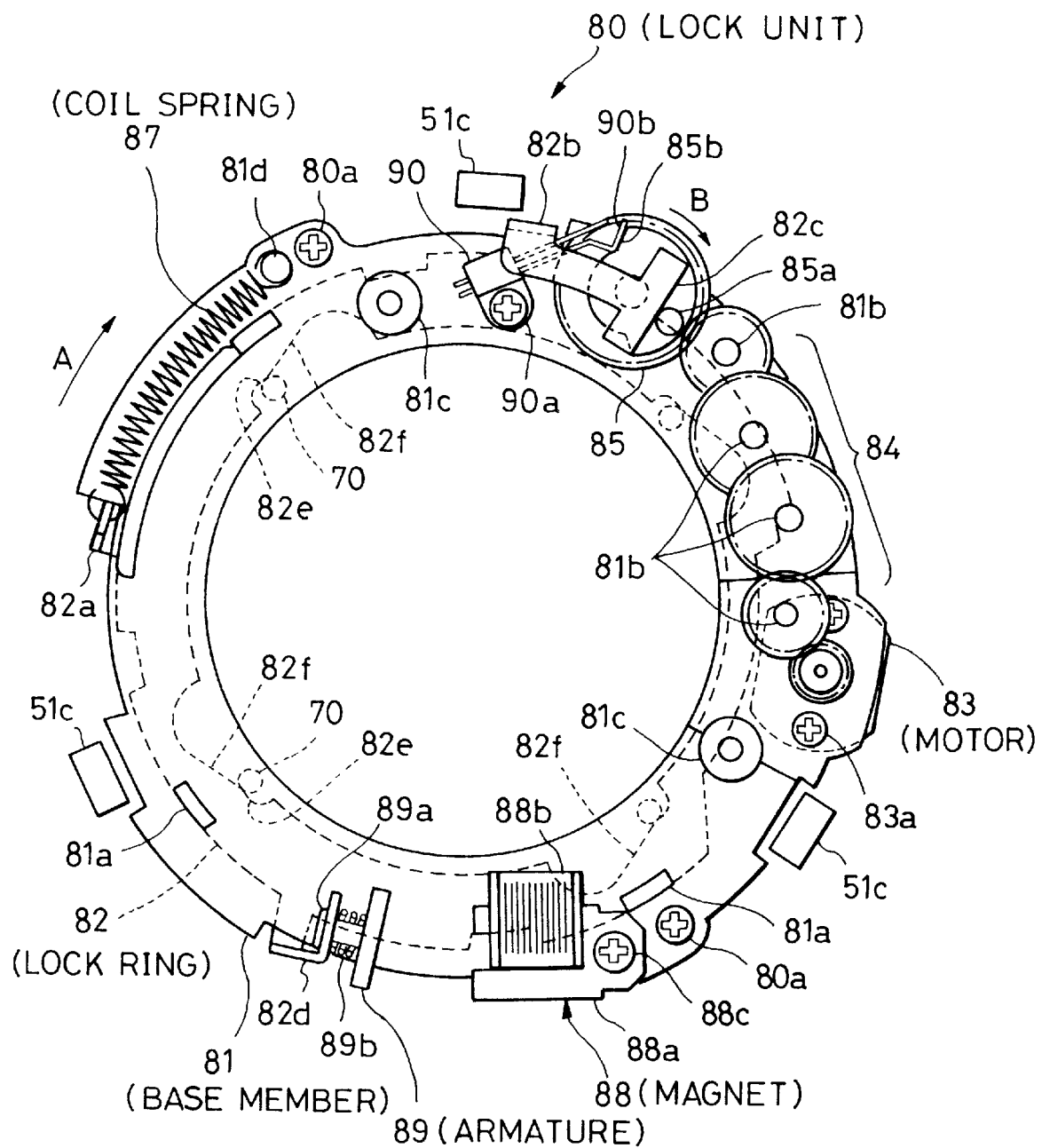
FIG. 3 is a plan view illustrating a state in which a second group lens L2 of FIG. 2 is fixed at a neutral position.
Figure 4:
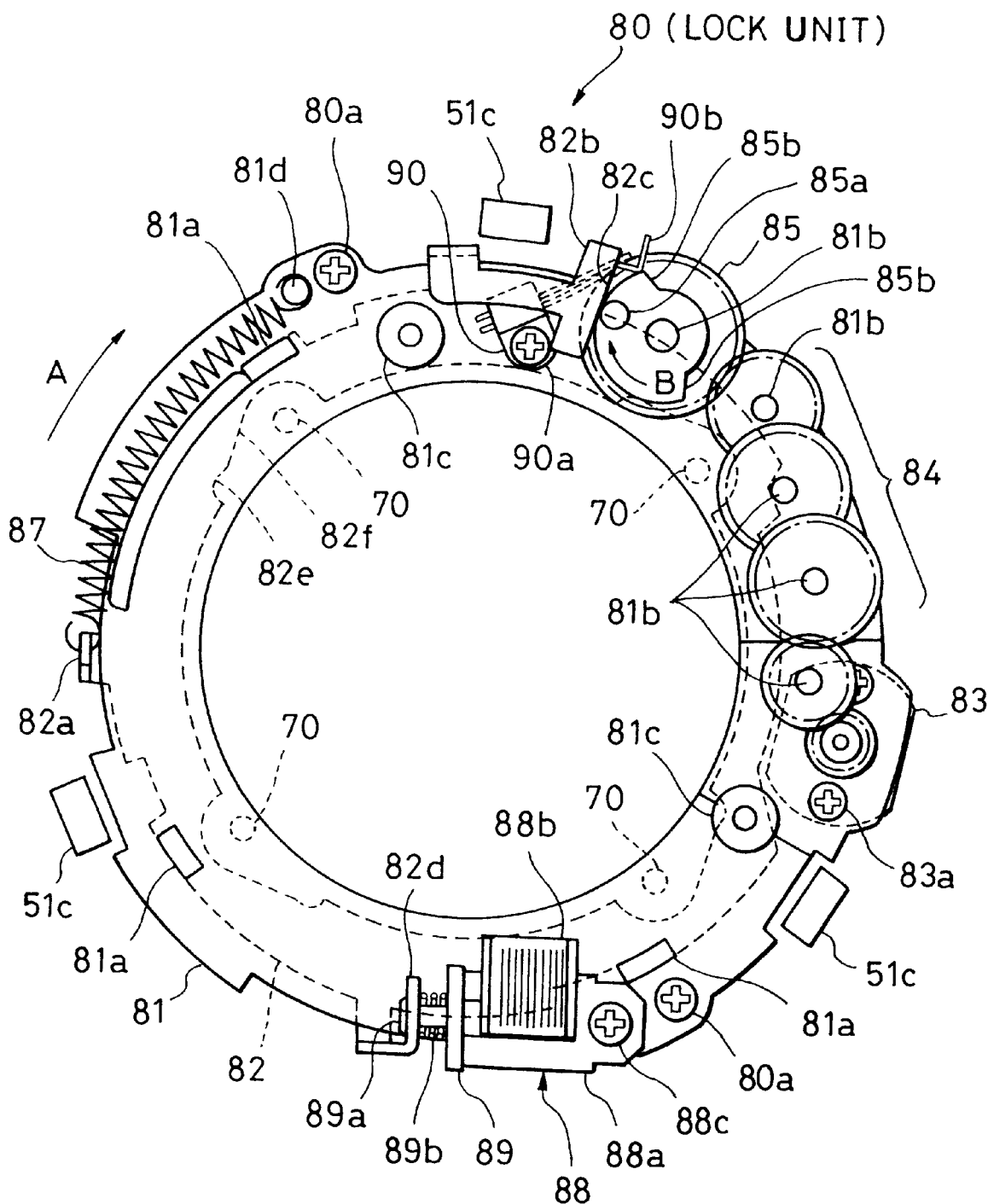
FIG. 4 is a plan view illustrating a state in which the second group lens L2 of FIG. 2 is movable in a shift direction.
Figure 12:
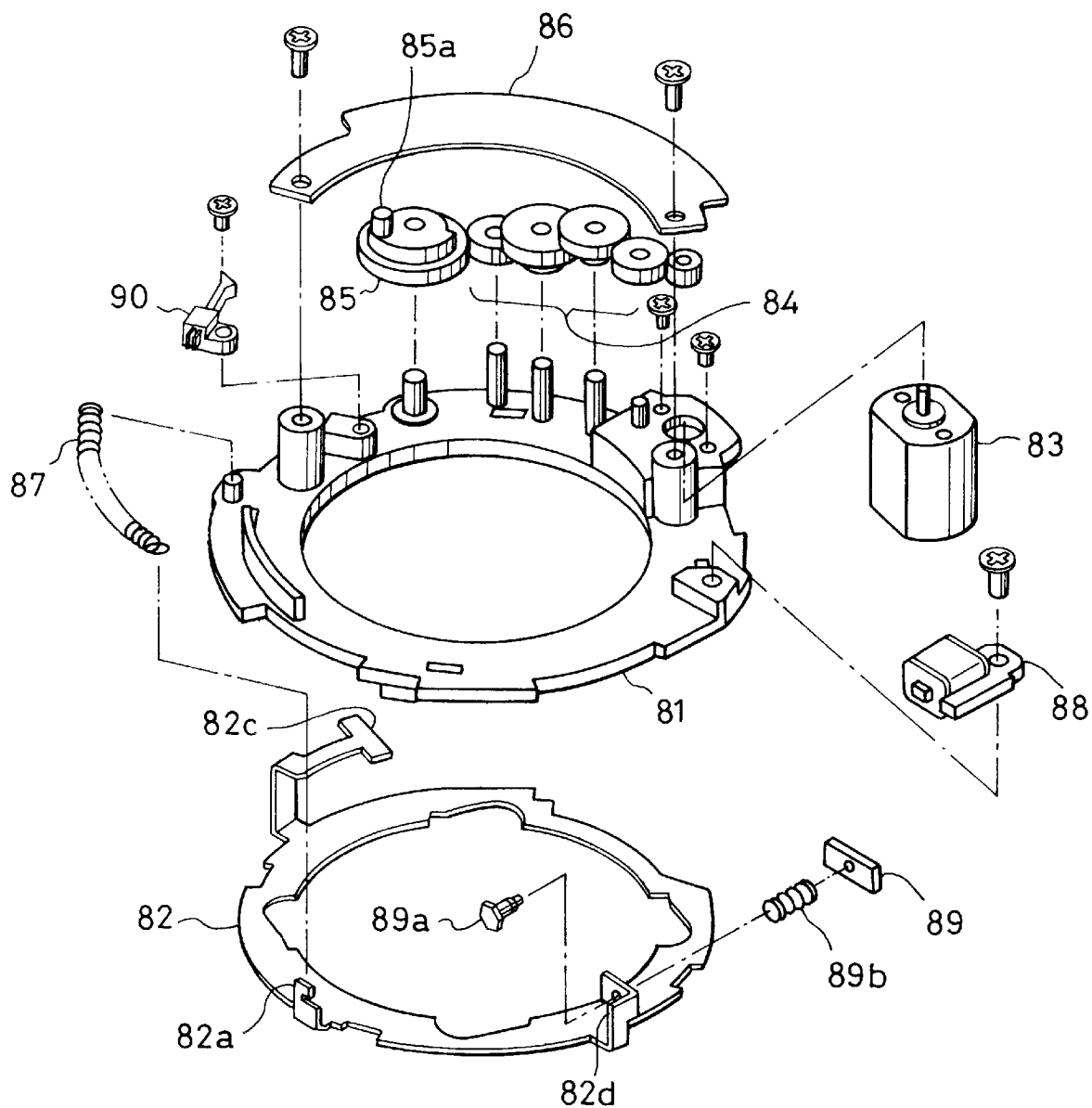
FIG. 12 is an exploded perspective view of a lock unit for fixing the second group lens L2 at a neutral position.

Next, a description will be given of a lock unit 80 for holding the second group lens L2, which is a correction lens, at the neutral position with reference to FIGS. 3, 4, and 12. FIG. 3 shows a state in which the second group lens L2 is fixed at the neutral position. FIG. 4 shows a state in which the second group lens L2 is movable in the shift direction. FIG. 12 is an exploded perspective view illustrating the construction of the lock unit 80.

Referring to FIGS. 3 and 4, reference numeral 81 denotes a base member which is integrally molded from a resin material; reference numeral 82 denotes a lock ring which is held rotatable about the optical axis by four bayonet claws 81a (one of them is not shown) provided in the base member 81; reference numeral 83 denotes a motor which is secured to the base member 81 by screws 83a; and reference numeral 84 denotes a gear train which is rotatably held in a gear shaft 81b integrally molded in the base member 81, which gear train transmits a torque of the motor 83 and is engaged with an output gear 85 at the final stage.

The position of the gear train 84 and the output gear 85 along the optical axis is regulated by a gear press 86 shown in FIG. 1, thereby preventing the gear train 84 and the output gear 85 from falling from the gear shaft 81b. The gear press 86 is secured by screws 86a to a column 81c of the base member 81.

Reference numeral 87 denotes a coil spring which is locked at its one end to a hook section 82a of the lock ring 82 and locked at the other end to a hook section 81d of the base member 81. As a result, the lock ring 82 is always urged along the direction of the arrow A shown in FIGS. 3 and 4.

A pin 85a is integrally molded in the output gear 85. An end surface 82c of an arm section 82b provided in the lock ring 82 is always brought into contact with the pin 85a by means of the coil spring 87. Therefore, when the output gear 85 is rotated by the motor 83, the lock ring 82 is rotated in a direction opposite to the A direction by the pin 85a.

Reference numeral 88 denotes a magnet which is formed of a yoke 88a and a coil 88b and is fixedly secured to the base member 81 by screws 88c. Reference numeral 89 denotes an armature to which a pin 89a is integrally secured by staking. This pin 89a is inserted into a hole (not shown) provided in an armature mounting section 82d of the lock ring 82 and is urged in a direction in which the armature 89 is moved away from the armature mounting section 82d by means of a spring 89b. Use of the spring 89b serves to improve the absorption of overcharge of the lock ring 82 by the motor 83 and improve the contact with the armature 89.

Reference numeral 90 denotes a switch which is fixedly secured to the base member 81 by screws 90a. In the screws 90a, the contact section 90b thereof is shifted by a cam 85b provided in the output gear 85, and the switch 90 is electrically turned on or off. The lock unit 80 is fixedly secured to the shake correction unit 5 by screws 80a.

Next, the operation of the lock unit 80 will be described below.

When a shutter button of the camera is half-pressed in a state in which the switch 20 for starting shake correction of the lens barrel is turned on, an unlock operation is performed to make the second group lens L2 to be shiftable.

Initially, the output gear 85 is rotated by the motor 83 in the direction of the arrow B in FIGS. 3 and 4 via the gear train 84. Thereupon, the lock ring 82 is pressed by the pin 85a provided in the output gear 85 and is rotated in a direction opposite to the A direction in the figure. Thereupon, four pins 70 protrusively provided in the eccentric frame 55 (see FIG. 2) inside the shake correction unit 5 are detached from the four fit sections 82e provided in the inner peripheral portion of the lock ring 82, and the eccentric frame 55 reaches a shiftable state. At this time, just before the lock ring 82 is rotated to the fullest in a direction opposite to the A direction, the switch 90 is turned on by the cam 85b of the output gear 85 (see FIG. 4). When electric current is supplied to the magnet 88 at the same time the switch 90 is turned on, the armature 89 is attracted to the magnet 88, and the lock ring 82 is held as shown in FIG. 4.

Thereafter, when the motor 83 is further rotated, the pin 85a of the output gear 85 is separated from the arm section 82b of the lock ring 82 and becomes farthest from the end surface 82c (the state of FIG. 3). At this time, the switch 90 is turned off, and the supply of electric current to the motor 83 is discontinued.

This terminates the unlock operation, and image blur correction with the second group lens L2, which is a correction lens being shifted, is made possible.

Next, the lock operation will be described.

When photographing is terminated or the half-pressing of the shutter button of the camera is released, a lock operation is performed to hold the second group lens L2 at a neutral position. This lock operation is performed by stopping the supply of electric current to the magnet 88.

When the supply of electric current to the magnet 88 is discontinued, the armature 89 is separated from the magnet 88 and the lock ring 82 is rotated in the direction of the arrow A by the urging force of the coil spring 87. Thereupon, the pin 70 provided in the eccentric frame 55 is moved to the neutral position (in this embodiment, the position at which the optical axis of the second group lens L2, which is a correction lens, coincides with the optical axis of another lens) by an inclined surface 82f of the lock ring 82 even if the pins 70 are at any shiftable position, after which the pins 70, i.e., the eccentric frame 55, is held at four fit sections 82e in a state in which the eccentric frame 55 cannot be shifted, and the lock operation is terminated (the state of FIG. 3).

Second Embodiment

Figure 5:
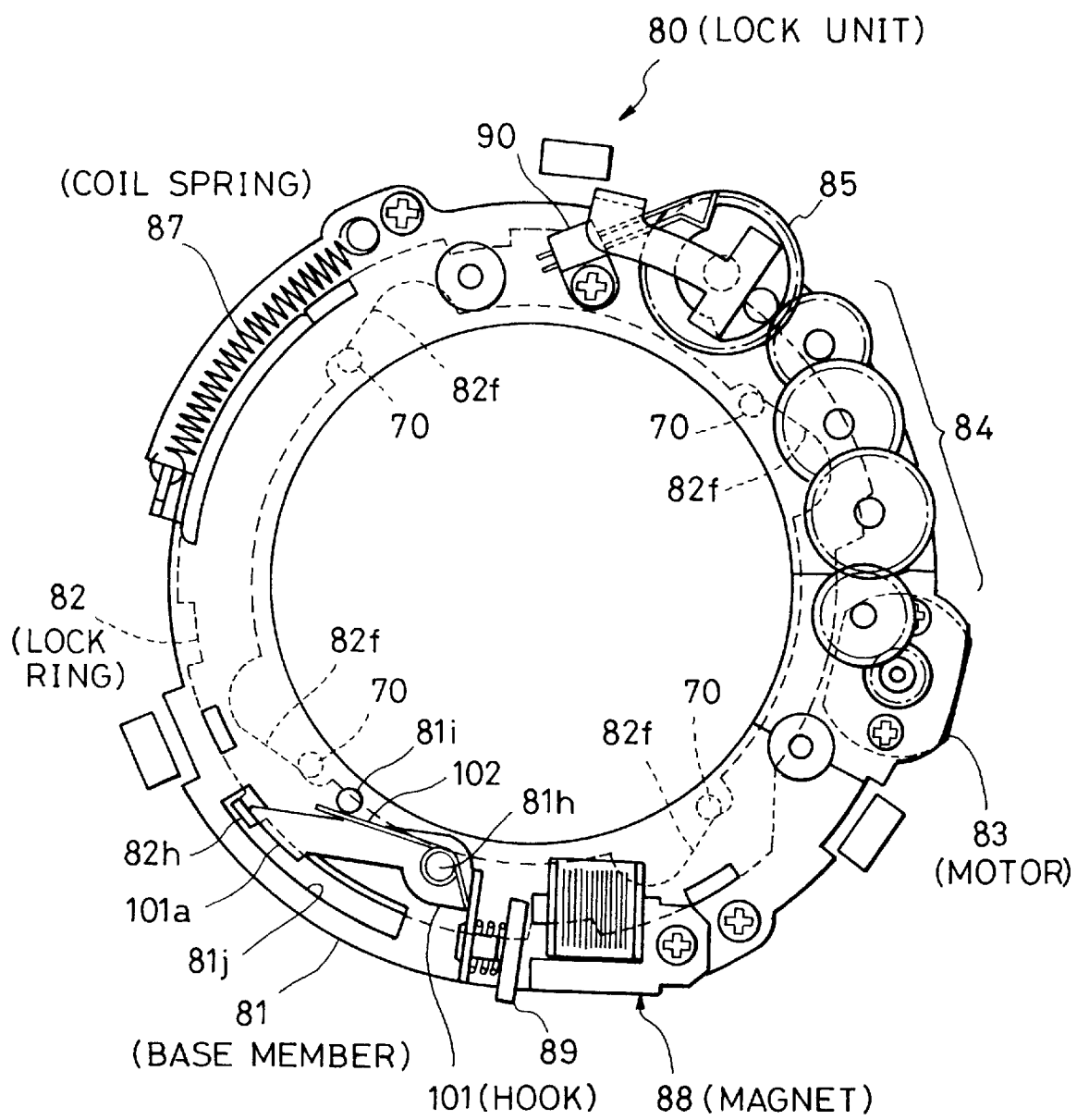
FIG. 5 is a plan view illustrating a state in which the second group lens L2 of FIG. 2 is fixed at a neutral position in accordance with a second embodiment of the present invention.
Figure 6:
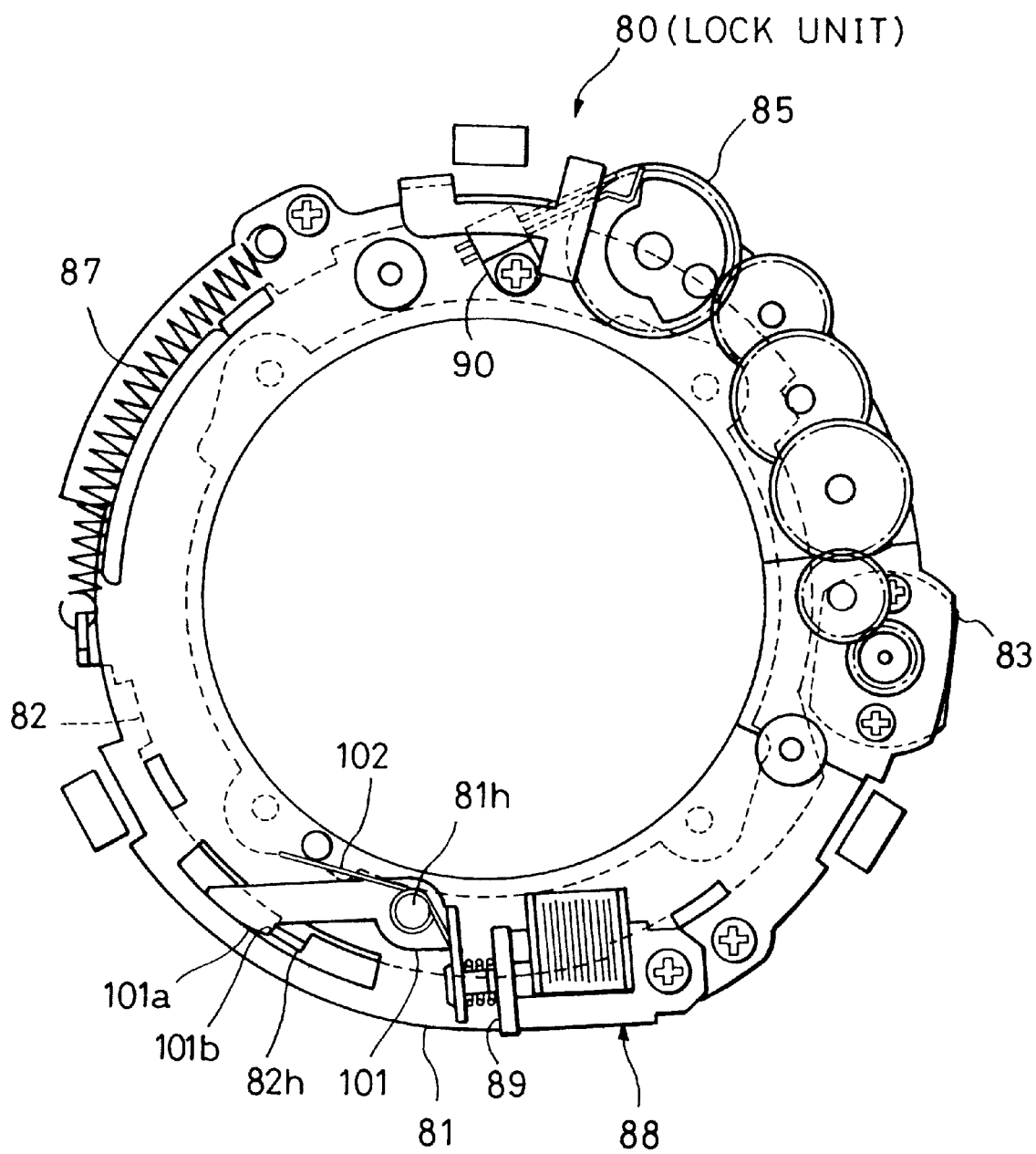
FIG. 6 is a plan view illustrating a state in which the second group lens L2 is movable in the shift direction in accordance with the second embodiment of the present invention.

FIGS. 5 and 6 are plan views of the lock unit 80 for making the second group lens, which is a correction lens, move to a neutral position and held in accordance with a second embodiment of the present invention.

In the second embodiment, the lock unit 80 is disposed to serve the same purpose as that of the first embodiment. The other components, for example, the lens barrel, or the second group lens, are the same as those of the first embodiment, and an explanation thereof is omitted. The components for performing the same operation as that in the first embodiment are given the same reference numerals.

FIG. 5 shows a state in which the second group lens L2 is fixed at a neutral position.

Referring to FIG. 5, reference numeral 101 denotes a hook formed of metallic press parts. This hook 101 is fitted into a hook shaft 81h protruding from the base member 81 and is held so as to be rotatable about the hook shaft 81h. The armature 89 is mounted in the hook 101 in the same manner as in the first embodiment.

Reference numeral 102 denotes a torsion spring. One side of the torsion spring 102 is brought into contact with the bending portion of the hook 101, and the other side is brought into contact with a projection 81i of the base member 81. The armature 89 is urged toward the magnet 88 via the hook 101. Reference numeral 82h denotes a lever provided in the lock ring 82, which is disposed so as to be inserted into a hole 81j of the base member 81. The hook 101 is formed in such a way that the end surface 101a of the hook 101 is always in contact with the lever 82h.

FIG. 6 shows an unlocked state in which the second group lens L2, which is a correction lens, can be moved.

In the same way as in the first embodiment, when the lock ring 82 is rotated by the motor 83, the lever 82h slides on the end surface 101a of the hook 101. Thereafter, when the lever 82h is detached from the end surface 101a, the hook 101 is rotated by the torsion spring 102, and an inclined surface 101b is hooked by the lever 82h as shown in FIG. 6. At this time, the switch 90 is turned on by the output gear 85, and electric current is supplied to the magnet 88. Thereupon, the armature 89 is attracted. Thereafter, the motor 83 continues to rotate in the same direction. When the output gear 85 reaches the position of FIG. 6, the switch 90 is turned off, and the motor 83 is stopped. During this time, supply of electric current to the magnet 88 is continued, and the hook 101 is held at the state of FIG. 6 by the attraction force of the magnet 88.

In the second embodiment, the coil spring 87 is a relatively strong spring which causes the lock ring 82 to rotate and has an attraction force strong enough to cause the second group lens L2 to move to the neutral position, whereas the torsion spring 102 is a weak spring which causes only the hook 101 to rotate. Therefore, even in the state in which the lock ring 82 is locked by the hook 101 as shown in FIG. 6, the spring force of the hook 101, the angle of the inclined surface 101b and the position of the hook shaft 81h are set so that the lock ring 82 can be easily released from the lock by the urging force of the coil spring 87 when there is no attraction force by the magnet 88.

That is, it is necessary to always supply electric current to the magnet 88 during the image blur correction. However, consumption of power is reduced more in a case in which the lock ring 82 is locked by the hook 101 and the state in which the hook 101 is locked is maintained by the magnet 88, as in this embodiment, than a case in which the lock ring 82 is directly held by the magnet 88 as in the first embodiment.

Third Embodiment

FIGS. 7 to 10 show a third embodiment of the present invention. Only the portions of the third embodiment which are different from the first embodiment will be described. Components for performing the same operations as those in the first embodiment are given the same reference numerals.

Figure 7:
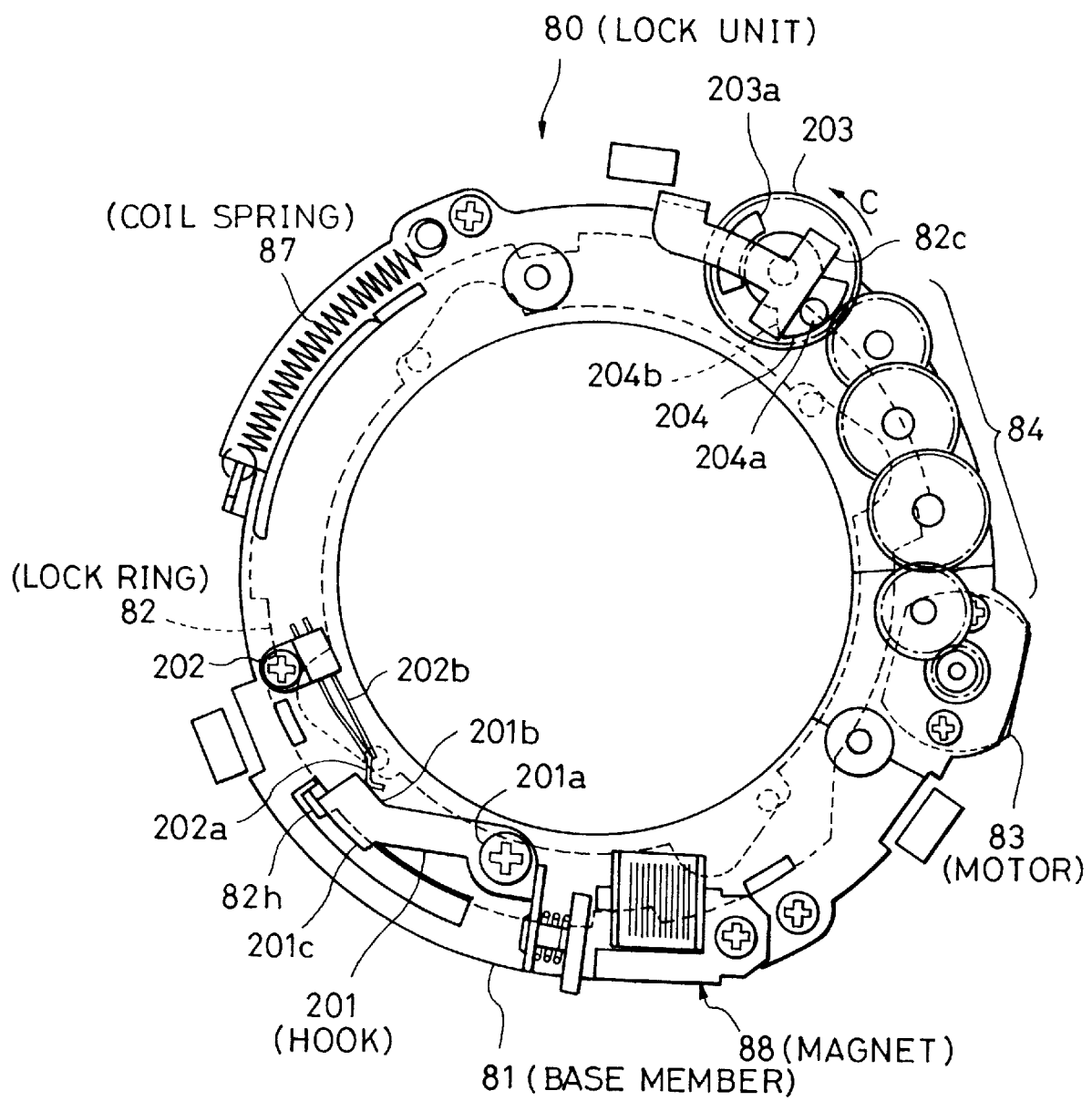
FIG. 7 is a plan view illustrating a state in which the second group lens L2 of FIG. 2 is fixed at a neutral position in accordance with a third embodiment of the present invention.

FIG. 7 shows a state in which the second group lens L2, which is a correction lens, is locked.

Referring to FIG. 7, reference numeral 201 denotes a hook which works the same way as the hook 101 of the second embodiment. The hook 201 is rotatably supported to the base member 81 by a shaft screw 201a. Reference numeral 202 denotes a switch which is always in contact with an end surface 201b of the hook 201. The switch urges in such a way that an end surface 201c of a hook 202 is pressed against the lever 82h of the lock ring 82 by the spring force of the switch. When the second group lens L2 is in a locked state, as shown in FIG. 7, a contact piece 202a of the switch 202 is in contact with another contact piece 202b, and the switch 202 is at its on state.

Figure 8:
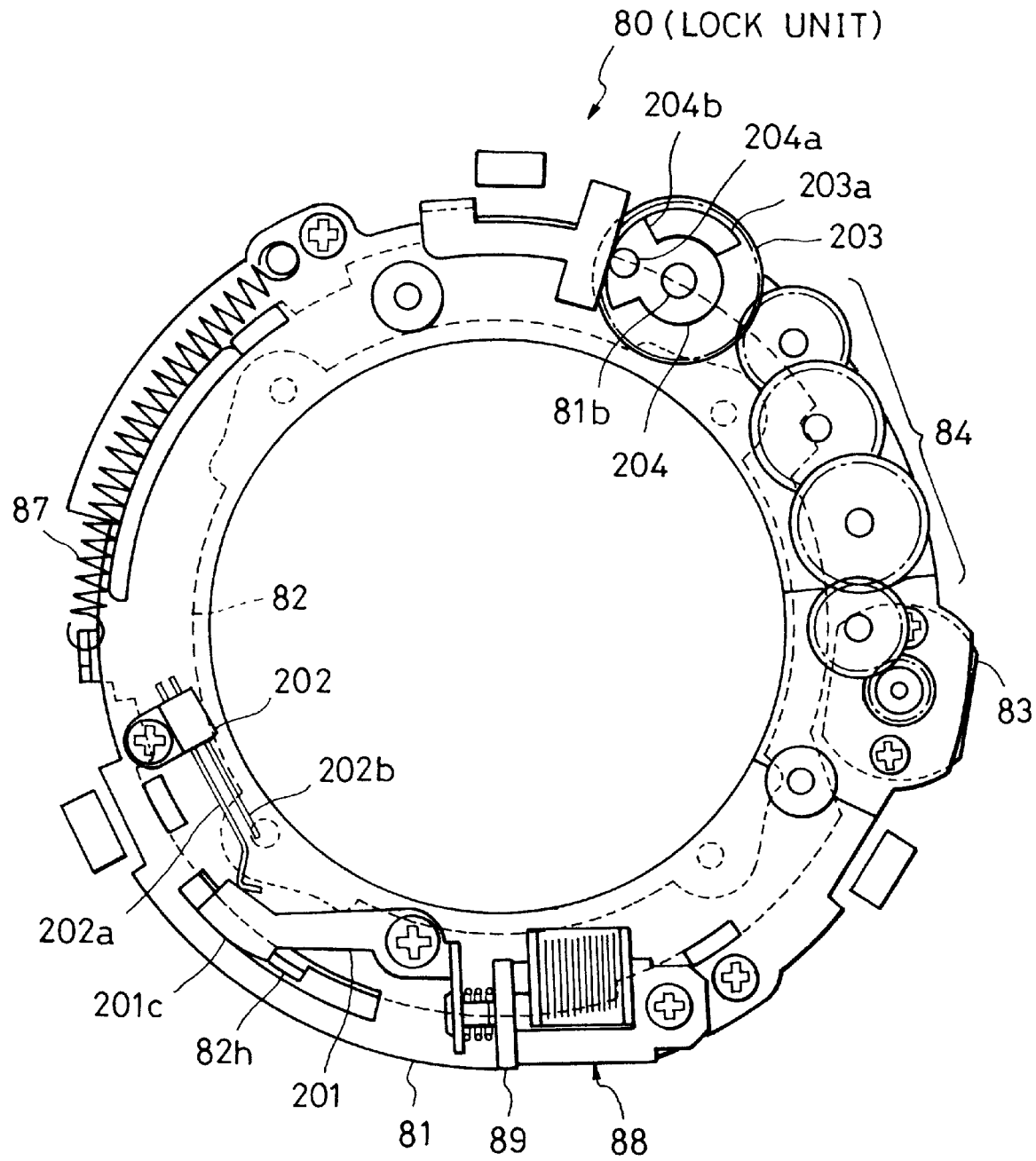
FIG. 8 is a plan view illustrating a state in which the second group lens L2 is movable in the shift direction in accordance with the third embodiment of the present invention.

FIG. 8 shows a state in which the second group lens L2 has changed from a locked state to a movable state.

Figure 9:
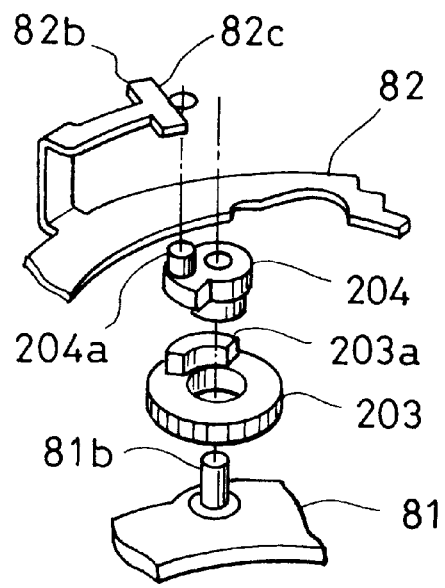
FIG. 9 is a perspective view illustrating the construction of an output gear 203 and an output ring 204 of FIG. 7.

Referring to FIG. 8, the lock ring 82 is rotated to the position of FIG. 8 by the driving force of the motor 83. The torque of the motor 83 is transmitted to a gear 203 at the final stage by means of the gear train 84. The gear 203, as also shown in FIG. 9, has a fan-shaped projection 203a. An output ring 204 is rotatably engaged with the inner periphery of the gear 203. A pin 204a is provided in the output ring 204, and the end surface 82c of the arm section 82b of the lock ring 82 is always brought into contact with the pin 204a by the urging force of the coil spring 87.

Next, the operation of this embodiment will be described.

First, in order to make the second group lens L2 change from the locked state to the movable state, the motor 83 is rotated to cause the gear 203 to rotate in the direction of the arrow C shown in FIG. 7. Thereupon, the output ring 204 is initially pressed by the lock ring 82 and turns free, but in due time the projection 203a of the gear 203 is brought into contact with a protrusive section 204b of the output ring 204, and these rotate as one unit.

When the state of FIG. 8 is reached after the lock ring 82 is rotated, the lever 82h of the lock ring 82 is unhooked from the end surface 201c of the hook 201, and the hook 201 locks the lock ring 82 by the spring force of the switch 202. At this time, the switch 202 changes from the on state to the off state. When the signal therefor is detected, electric current is supplied to the magnet 88. Thereupon, the armature 89 is attracted, and the state in which the lock ring 82 is locked by the hook 201 is maintained.

Figure 10:
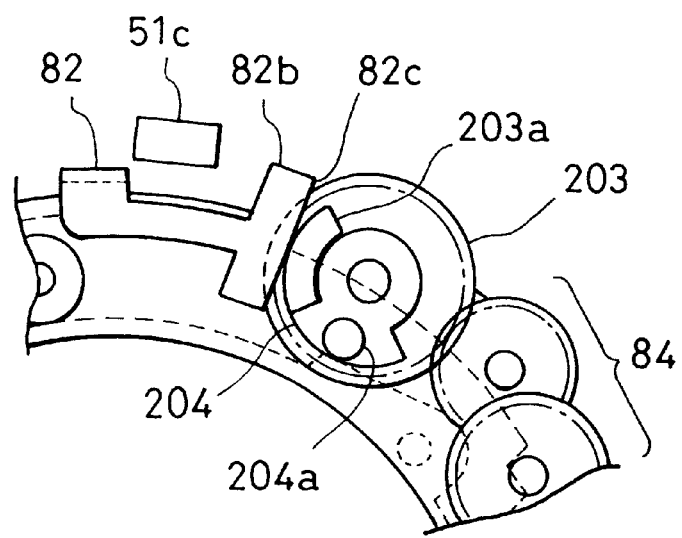
FIG. 10 is a plan view illustrating the construction of the output gear 203 and the output ring 204 of FIG. 7.

The motor 83 continues to rotate even after this locking is completed, and when the pin 204a of the output ring 204 comes to the position nearly in the middle of the rotation range of the lock ring 82 as shown in FIG. 10, the motor 83 is stopped (stopped on the basis of an output from a timer for measuring a predetermined time).

Next, in order to achieve a locked state, the supply of the electric current to the magnet 88 is released in the same way as in the first and second embodiments. Similarly to the second embodiment, when the attraction force of the magnet 88 ceases, the locking of the hook 201 is released by the coil spring 87, and the lock ring 82 rotates clockwise in FIG. 8. At this time, the arm section 82c of the lock ring 82 is brought into contact with the pin 204a of the output ring 204. Then, the output ring 204 turns free and rotates to the position of FIG. 7, thus the lock operation is terminated.

The reason why the output gear 203 and the output gear 204 are separated from each other is that the stop accuracy of the motor 83 can be achieved relatively roughly. That is, when the pin 204a and the output gear 203 are rotated integrally, the pin 204a must be stopped at the position of FIG. 7. For this purpose, a sensor for detecting the rotational position of the output gear 203 is required. Even so, it is difficult to stop the gear 203 with a high degree of accuracy due to the intensity of the voltage applied to the motor 83, backlash of the gear or the like. Therefore, in this embodiment, the gear 203 and the output ring 204 are separated from each other, and the output ring 204 may be made to turn free so that the pin 204a is stopped at any position in about 180° from the position of FIG. 8 to the position of FIG. 7, and can be controlled by an ON-OFF signal level of the switch 202.

In this embodiment also, since the lock ring 82 is locked via the hook 201 in the same way as in the second embodiment, consumption of electric power can be reduced. Also, since the output gear 203 and the output ring 204 are separated from each other, it is possible to decrease the stop accuracy of the motor 83, to relax the operating conditions without depending upon whether the voltage of the power supply is high or low and thus to reduce malfunctions. Further, the contact piece of the switch 202 is used for the urging force of the hook 201, and thus an inexpensive lock mechanism which does not require a torsion spring and is simple in construction and operates reliably is realized.

According to each of the above-described embodiments, when the correction lens (the second group lens L2) is to be locked, supply of electric current to the magnet 88 is stopped, and thereafter the lock ring 82 is rotated by the urging force of the coil spring 87 in order to lock the correction lens. Therefore, even if power is lost regardless of the intention of the photographer because, for example, the voltage is decreased when the battery is used as the power source, or because of the replacement of the battery or an inadvertent disconnection of the battery, it is possible to securely lock the correction lens and to prevent unpleasant noise due to rattle of the correction lens and prevent damage to the apparatus. Further, since a backup power supply for supplying electric power in a case where power is lost suddenly is not necessary, it is possible to simplify the control circuit and to make the apparatus compact.

Also, the correction lens is moved to an unlocked position by the motor 83 and the gear train 84, after which this position (the unlocked position) is maintained by the magnet 88. Since the operation is shared as described above, to put it differently, since such a sharing construction is made even though the above operations can be performed by only the magnet 88, it is possible to save electric power.

In addition, as in the second and third embodiments, since the hooks 101 and 201 are provided, and the unlocked position of the correction lens is maintained by these hooks, it is possible to reduce the holding force of the magnet 88 and to reduce the consumption of electric power.

Figure 11:
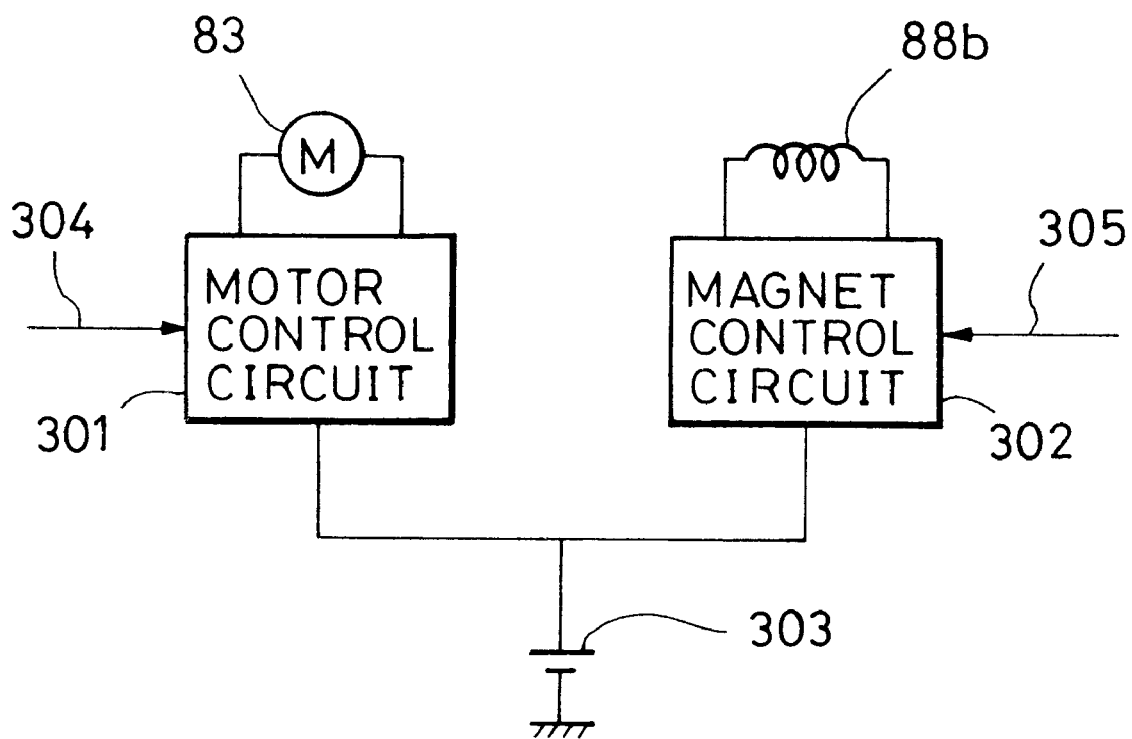
FIG. 11 is a block diagram illustrating the schematic construction of a power-supply circuit for use in each embodiment of the present invention.

FIG. 11 is a block diagram illustrating the schematic construction of an apparatus for controlling the motor 83 which generates a driving force for performing a lock releasing operation and the magnet 88 for holding the lock released state.

Referring to FIG. 11, reference numeral 301 denotes a motor control circuit for controlling the power supply state to the motor 83 from a power supply 303 in accordance with an input signal from an input section 304; and reference numeral 302 denotes a magnet control circuit for controlling the power supply state to a coil 88b of the magnet 88 from the power supply 303 in accordance with an input signal from an input section 305. In the first embodiment, for example, a signal for starting (i.e., starting the motor) the supply of electric power is input from the input section 304 in accordance with the half-pressing of the shutter button and a signal for stopping (i.e., stopping the motor) the supply of electric power is input in accordance with the turning off of the switch 90. Also, a signal for starting the supply of electric power to the coil 88b in accordance with the turning on of the switch 90 is input from the input section 305, and a signal for starting the supply of electric power to the coil 88b is input therefrom when the photographing terminates or in accordance with the releasing of the half-pressing of the shutter button.

Electric power supplied to the coil 88b from the magnet control circuit 302 is set to be smaller than the electric power supplied to the motor 83 from the motor control circuit 301. The electric power consumed to hold the lock released state by the coil 88b is less than the electric power consumed to perform the lock releasing operation by the motor 83.

FIGS. 13 to 16 show a modification of the arrangement shown in FIG. 11 for supplying electric power.

Figure 13:
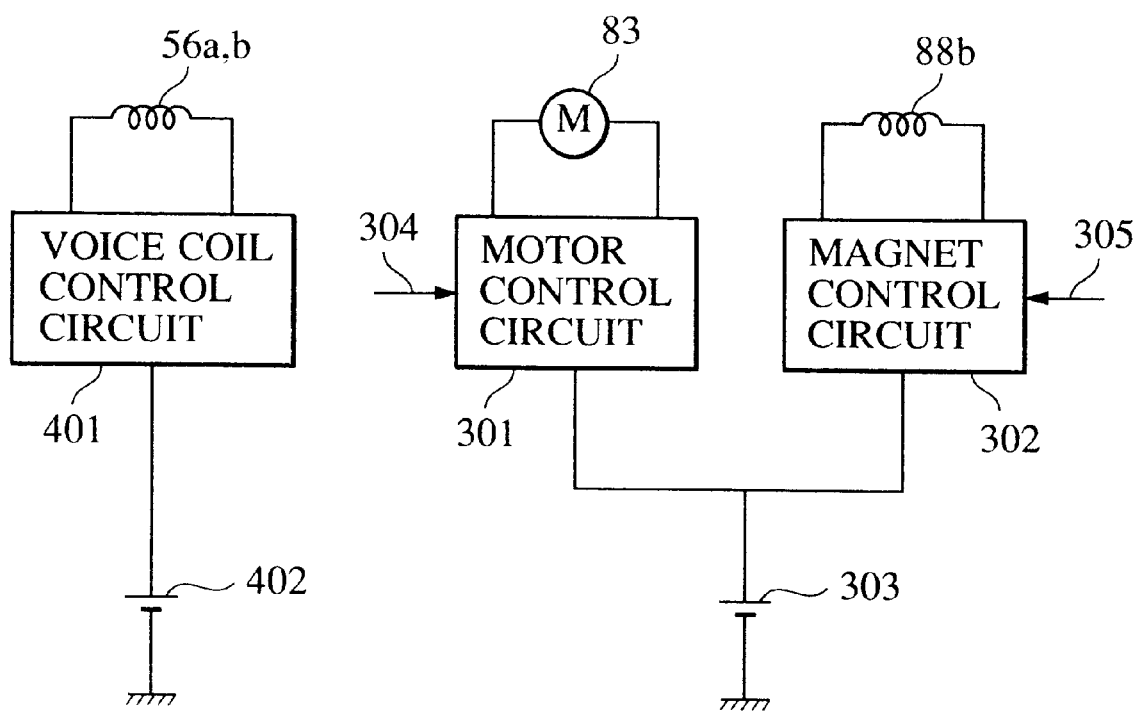
FIG. 13 is an exploded perspective view of the lock unit for fixing the second group lens L2 at the neutral position.

FIG. 13 shows an example in which an electric supply 402 for supplying electric power to the voice coils 56a and 56b for driving the correction lens L2 and the power supply 303 for supplying electric power to the motor 83 and the coil 88b involved in the locking of the correction lens L2 are provided separately. This arrangement is designed to cope with the situation described below.

In order to drive the correction lens L2 at a high frequency and at a large amplitude, a large electric power is required by the voice coils 56a and 56b. Therefore, in such a situation, a load applied to a first electric source for supplying electric power to the voice coils 56a and 56b is large, and the voltage level of the electric source decreases.

If the power-supply source of the motor 83 and the coil 88b involved in the locking is the same as the above-mentioned battery, the voltage drops, causing the electric current flowing through the coil 88b to decrease, and the action of the electromagnet becomes weak. The urging force of the coil spring 87 causes the lock ring 82 to rotate, and locking is performed inadvertently. Thus, the correction lens L2 is locked even though the image blur correction operation is being performed.

The arrangement shown in FIG. 13 is designed to solve the above-described problem. With such an arrangement, the above-described misoperation of the coil 88b will not occur, and the reliability of shake prevention is improved.

In FIG. 13, reference numeral 401 denotes a voice coil control circuit for controlling the supply of electric power to the voice coils 56a and 56b.

In the example of FIG. 13, the power supply for supplying electric power to the voice coils 56a and 56b for driving the correction lens L2 and the power supply for supplying electric power to the lock mechanism are provided separately. However, if the voltage of the power supply for the lock mechanism does not drop, there is no need to provide power supplies separately.

Figure 14:
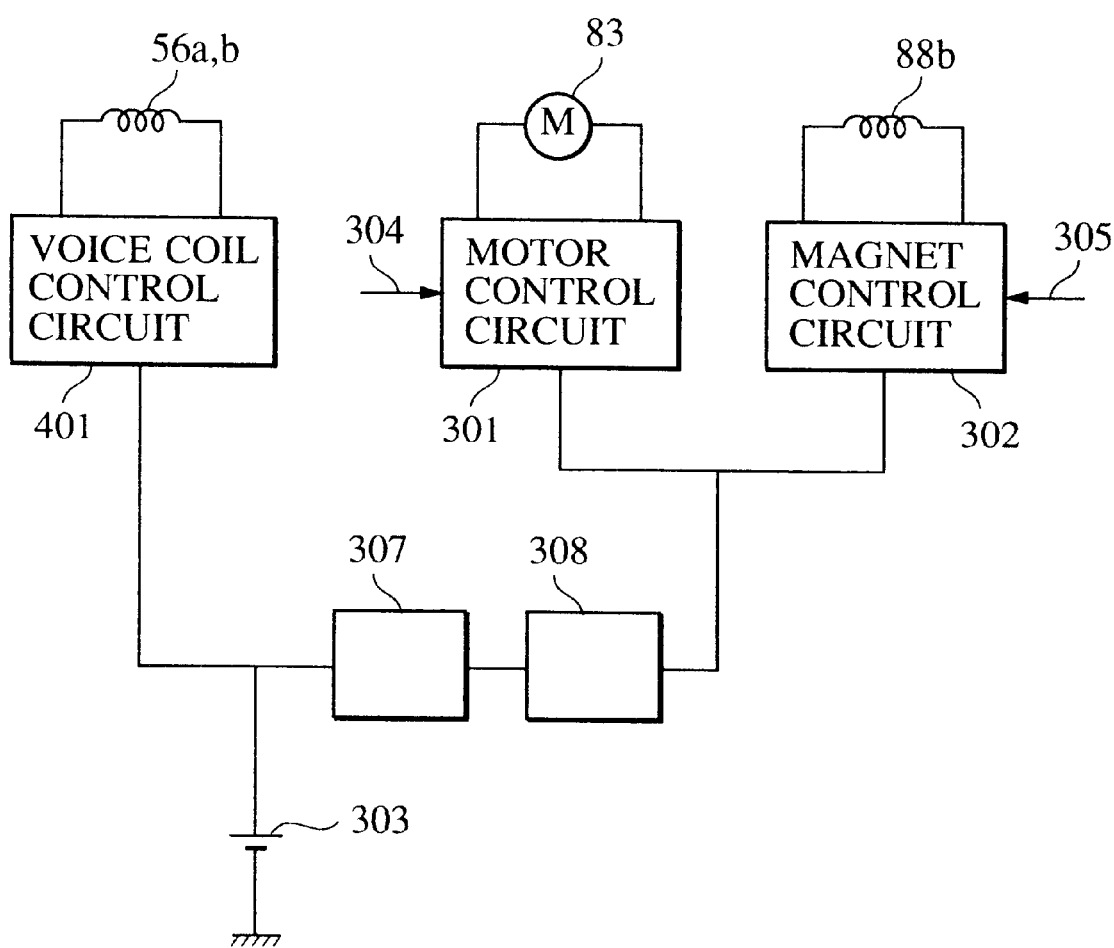
FIG. 14 is an exploded perspective view of the lock unit for fixing the second group lens L2 at the neutral position.

Thus, in an example of FIG. 14, the voltage of the power supply 303 is stepped up by a DC/DC converter 307, this output is input to a regulator 308 where the voltage is regulated, and the output is supplied to the coil 88b. Therefore, the output voltage 308a of the regulator 308 does not vary even if the voltage of the power supply 303 drops. If this output 308a is supplied to the coil 88b, the coil 88b operates properly even if a large load is applied to the power supply 303.

FIG. 15 shows an example in which a power supply 403 for supplying electric power to the voice coils 56a and 56b and the power supply 303 for supplying electric power to the coil 88b are provided separately. The arrangement is also able to solve the above-described problem.

In FIG. 16, electric power is supplied to the voice coils 56a and 56b, the motor 83 and the coil 88b from the common power supply 303, but electric power is supplied to the coil 88b via the DC/DC converter 307 and the regulator 308 in the same way as in the example of FIG. 14.

The arrangement of FIGS. 11, and 13 to 16 is used in common for the first to third embodiments.

According to the above-described apparatus of each embodiment of the present invention, the setting to the unlocked state of the correction optical system (the second group lens L2) is performed by moving a lock member (the lock ring 82) by means of driving means, such as the motor 83 or the gear train 84. The correction optical system is held in this state by holding means, such as the magnet 88, the armature 89 and the hooks 101 and 201, for electrically holding the lock member. That is, changing of the state of the correction optical system and the holding at the unlocked state are shared by various means so as to perform each operation efficiently. The changing of the state of the correction optical system from the unlocked state to the locked state can be performed via the lock member by an elastic member, such as the coil spring 87, in a state in which the supply of electric power to the holding means is discontinued.

As a result, less electric power is required to change the state of the correction optical system and to hold the correction optical system at the unlocked state, and it is possible to hold the correction optical system at a predetermined position without providing a backup power supply even if the supply of electric power to the apparatus is insufficient or the electric power is discontinued inadvertently. Thus, electric power can be saved, the apparatus can be made compact, and the cost of the apparatus can be reduced.

According to the present invention, the unlocked state of the correction optical system (the second group lens L2) is maintained by mechanical holding means, such as the hooks 101 and 201, and electrical holding means, such as the magnet. 88 or the armature 89. Thus, the electric power consumed to hold the unlocked state of the correction optical system is reduced.

The present invention is not limited to the above-described embodiments. Needless to say, the present invention may be any arrangement in which the functions described in the claims or the functions of the embodiments can be achieved.

The present invention is not limited to the arrangement of the above-described embodiments, and various types of electrical lock and unlock mechanisms and manual lock mechanisms may be combined.

Although the above-described embodiments describe a case in which the present invention is applied to cameras, such as single-lens reflex cameras, lens shutter cameras or video cameras, the present invention may be applied to other optical instruments, other apparatus, and further applied as component units.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur prevention apparatus comprising:
   an image blur prevention device which prevents image blur by moving a moveable member;
   a locking device which locks said moveable member;
   a releasing device which releases the locking device from a lock state where said moveable member is locked to an unlock state where said moveable member is not locked; and
   a holding device which holds said locking device to be in the unlock state, said holding device including an operation portion generating power by the supply of electric current and effecting the holding operation by use of the power;
   wherein operation of said holding device switches from the holding operation to a state in which the holding operation is not effected, when the supply of electric current to the operation portion is substantially discontinued.

2. An apparatus according to claim 1, wherein the locking device comprises means for restricting the movement of the image blur prevention device by the effect of a predetermined urging force and said holding device comprises means for holding the released state in opposition to the predetermined urging force.

3. An apparatus according to claim 2, wherein the restricting device comprises means for locking the movement of the image blur prevention device by the effect of an elastic force, and the holding device comprises means for holding the released state in opposition to the elastic force.

4. An image blur prevention apparatus according to claim 1, wherein the image blur prevention device comprises a movable member which moves to prevent image blur, and the restricting device comprises means for locking movement of the movable member.

5. An image blur prevention apparatus according to claim 1, wherein the locking device comprises a movement member, which is movable, for bringing the image blur prevention device to the restricted state by being positioned at a predetermined position, wherein said releasing device comprises means for displacing the movement member from the predetermined position so as to release the restricted state, and said holding device comprises means for holding a state in which the movement member is positioned at a position different from the predetermined position.

6. An image blur prevention apparatus according to claim 1, wherein said releasing device comprises a motor.

7. An image blur prevention apparatus according to claim 1, wherein said holding device comprises an electromagnet.

8. An image blur prevention apparatus according to claim 1, wherein said apparatus is disposed in an optical apparatus.

9. An image blur prevention apparatus according to claim 1, wherein said apparatus is disposed in an apparatus used for photographing.

10. An image blur prevention apparatus according to claim 1, wherein said holding device is separate from said releasing device.

11. An image blur prevention apparatus comprising:
    an image blur prevention device which prevents image blur by moving a moveable member;
    a locking device which locks said moveable member; and
    an operation device which releases the lock state operated by said locking device, wherein said operation device effects a releasing operation which switches the locking device from the lock state where said moveable member is locked to an unlock state where said moveable member is not locked and a holding operation which holds the unlock state, said operation device being supplied with a first amount of electric power when the releasing operation is effected and being supplied with a second amount of electric power which is different from the first amount when the holding operation is effected, said operation device further switching from the holding operation to a state in which the holding operation is not effected when the state where electric power is supplied is switched to the state where electric power is substantially discontinued.

12. An image blur prevention apparatus according to claim 11, wherein the locking device comprises means for restricting the movement of the image blur prevention device by the effect of a predetermined urging force and said operation device comprises means for holding the released state in opposition to the predetermined urging force.

13. An image blur prevention apparatus according to claim 11, wherein said operation device comprises a means for performing a releasing operation on the basis of a supply of a first amount of electric current, and for holding the released state on the basis of a supply of a second amount of electric current, different from the first amount.

14. An image blur prevention apparatus according to claim 13, wherein the second amount of the electric current is less than that of the first amount.

15. An image blur prevention apparatus according to claim 11, wherein said operation device comprises means for performing the releasing-operation by a motor.

16. An image blur prevention apparatus according to claim 11, wherein said operation device comprises means for holding the released state by an electromagnet.

17. An image blur prevention apparatus according to claim 11, wherein said apparatus is disposed in an optical apparatus.

18. An image blur prevention apparatus according to claim 11, wherein said apparatus is disposed in an apparatus used for photographing.

19. An image blur prevention apparatus according to claim 11, wherein the locking device comprises means for restricting the movement of the image blur prevention device by the effect of a predetermined urging force and said operation device comprises means for releasing the restricted state in opposition to the predetermined urging force.

* * * * *

UNITED STATES PATENT AND TRADEMARK OFFICE
CERTIFICATE OF CORRECTION

PATENT NO. : 5,897,226
DATED : April 27, 1999
INVENTOR(S) : TADANORI OKADA

It is certified that error appears in the above-identified patent and that said Letters Patent is hereby corrected as shown below:

COLUMN 2

Line 13, "on" should read --in--.

COLUMN 12

Line 9, "large" should read --large amount of--.

COLUMN 14

Line 15, "restrict-" should read --lock- --;
    Line 16, "locking" should read --restricting--; and
    Line 23, "restricting" should read --locking-- and "locking" should read --restricting--.

UNITED STATES PATENT AND TRADEMARK OFFICE
CERTIFICATE OF CORRECTION

PATENT NO. : 5,897,226

DATED : April 27, 1999

INVENTOR(S) : TADANORI OKADA

It is certified that error appears in the above-identified patent and that said Letters Patent is hereby corrected as shown below:

COLUMN 15

Line 18, "releasing-operation" should read --releasing operation--.

Signed and Sealed this

Fifteenth Day of February, 2000

Attest:

Q. TODD DICKINSON

Attesting Officer

Commissioner of Patents and Trademarks